April 1, 1969

J. R. JOHNSTON 3,435,848

FLUID LINE COUPLER

Filed March 20, 1967

INVENTOR.
JAMES R. JOHNSTON

BY

*Richard K. Macneill*

United States Patent Office 3,435,848
Patented Apr. 1, 1969

3,435,848
FLUID LINE COUPLER
James R. Johnston, 4021 La Salle St.,
San Diego, Calif. 92110
Continuation-in-part of application Ser. No. 548,217,
May 6, 1966. This application Mar. 20, 1967, Ser.
No. 624,473
Int. Cl. F16l 37/28
U.S. Cl. 137—614.04    2 Claims

ABSTRACT OF THE DISCLOSURE

A fluid line coupler with a spring-loaded shut-off valve on each mating end for shutting off fluid upon disconnection with an automatic locking sleeve when one mating half is placed within the other mating half and a retaining spring which can be overcome by a predetermined stress tending to pull the coupler apart at which time the coupler is disconnected with each line coupled thereby being shut off by the spring-loaded valves.

*Cross-references to related applications*

Figure 1:
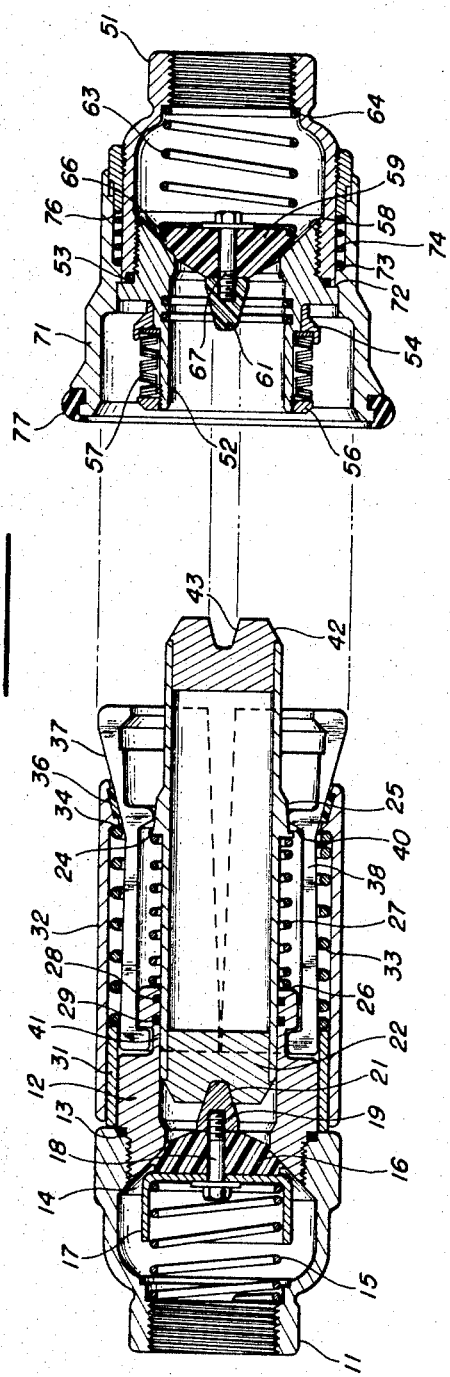

This application is a continuation-in-part of an application for Fluid Line Coupler, Ser. No. 548,217 filed on May 6, 1966, by Mr. James R. Johnston.

*Background of the invention*

The present invention relates to a fluid line coupler and more particularly to a fluid line coupler having automatic connecting and disconnecting features with an automatic shut-off valve on each end thereof.

The fluid line coupler of the above referenced copending application had two disadvantages which the instant invention is designed to overcome. The first disadvantage lay in its relatively difficult manual disconnection as opposed to the automatic disconnection when a predetermined stress was placed on the two lines being coupled tending to pull them apart. The second disadvantage lay in the absence of a protective sleeve to avoid damaging the more delicate mechanisms when the coupler is in use from external forces.

According to the invention, an improved fluid line coupler is provided having an automatic shut-off valve on each cooperating end for shutting off fluid automatically upon disconnection. A locking means automatically couples the fluid line when one mating part is placed within the other requiring no external clamping or threaded engagement. The clamping mechanism has a spring-biased external sleeve holding it firmly clamped in place unless a predetermined stress is put upon the line having to pull the coupler apart. When this predetermined stress is reached, a first spring biasing means will be overcome allowing pressure to be applied to the spring-biased external sleeve which will, in turn, recess the sleeve allowing the clamping mechanism to open, disconnecting the coupler. At this time, a valve in each half of the coupler automatically closes, setting off fluid to each end of the coupler. A further external sleeve is utilized as a protective measure and as a simple latching means allowing the fluid coupler to be easily manually opened by simply recessing the first outer sleeve which automatically applies opening pressure against the external clamping sleeve referred to above. The locking sleeve preferably utilizes a resilient external lip to prevent damage to the mechanism to the coupler from external forces while in use.

An object of the present invention is the provision of an improved fluid line coupler having automatic clamping.

Another object is to provide an improved fluid line coupler which automatically disconnects under a predetermined stress.

A further object of the invention is the provision of a fluid line coupler having an automatic shut-off on each end upon disconnection thereof.

Yet another object of the invention is to provide an improved fluid line coupler having a simple manual disconnect mechanism.

Yet another object of the invention is to provide an improved fluid line coupler which is compact and light in weight.

A still further object is to provide an improved fluid line coupler which is inexpensive to manufacture, simple to assemble and extremely convenient and reliable in use.

A still further object of the invention is the adjustable stress feature. The tension spring can be removed from inside of jaws and replace spring in external sleeve for same results by using additional manual releasing sleeve at front for same results.

Figure 2:
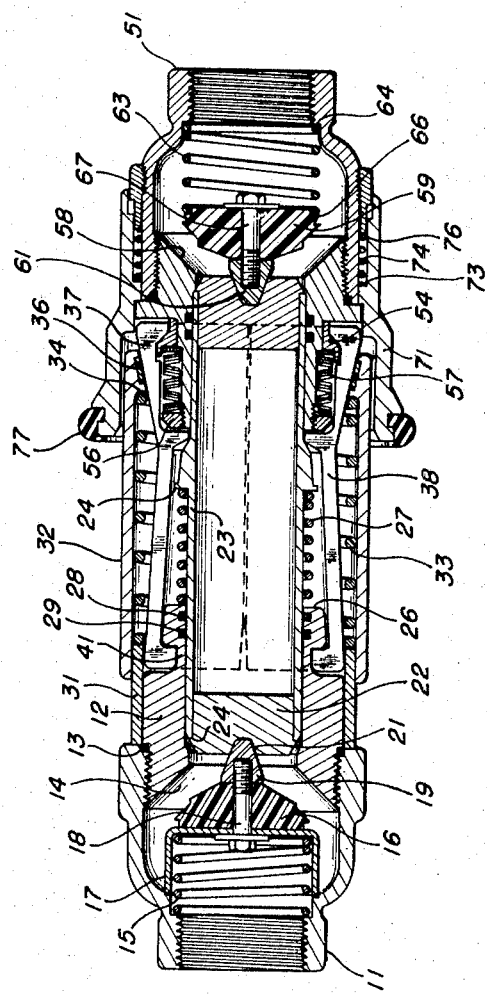

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a sectional view of the preferred embodiment of the present invention shown disconnected; and FIG. 2 is a sectional view of the embodiment of FIG. 1 shown in the engaged position.

Referring to both FIGURES 1 and 2, fitting 11 is threadably engaged with fitting 12 having an O-ring seal at 13. Fitting 12 terminates in a belt edge valve seat 14 which cooperates with inner valve assembly 16. Inner valve assembly 16 is connected to valve stop 17 by a bolt 18 and a tapered nut 19. Tapered nut 19 fits into a recess 21 of a recessed spider fitting 22 which is slidably received by cylinder 23. Recessed spider fitting has a shoulder 24 which forms a limit with the end of cylinder 23. Cylinder 23 is slidably received by fitting 12 and has an outside shoulder 24 which cooperates with an end surface 26 of fitting 12 to limit compression spring 27 which is carried on the outside of cylinder 23. O-rings 28 and 29 effect a seal between fitting 12 and cylinder 23.

A stop sleeve 31 is carried by fitting 12 and abuts the end of fitting 11. Clamping sleeve 32 is carried by cylinder 31 and is biased to the right by compression spring 33. Compression spring 33 is held between another end of cylinder 31 and an inner shoulder 34 of clamping sleeve 32. Clamping sleeve 32 has a Teflon ring 36 which is in slidable engagement with inclined surfaces 37 toward one end of extendable jaws 38. The other end of expandable jaws 38 is held between an inner side of cylinder 31 and a recess 41 in fitting 12. Recessed spider fitting 42 is fixedly held within another end of cylinder 23 having a guide recess 43 therein.

End fitting 51 is in threadable engagement with fitting 52, O-ring 53 effecting a seal therebetween. Retaining end fitting 52 carries a slidable retaining flange 54 and threaded retaining flange 56 resilient spring steel washers 57 are also carried by fitting 52 between spring retaining flanges 54 and 56.

Bevelled surface 58 of fitting 52 forms a valve seat in cooperation with inner valve assembly 59. Inner valve assembly 59 is coupled to tapered nut 61 by a bolt 62. Compression spring 63 terminates at one end on an inner shoulder 64 of fitting 51 and at the other end in angular recess 56 of inner valve assembly 59. Protective sleeve 71 is slidably carried by fittings 51 and 52 having a limiting inner shoulder 72 and a spring retaining shoulder 73 for retaining compression spring 74 against one end of spring retainer 76. A recessed rubber protective ring 77 is also carried by the open end of protective sleeve 71.

Operation

Referring back to FIG. 1, the coupler is shown in its decoupled position. Here, outer sleeve 32 has been slidably recessed along cylinder 31 and inclined surface 37 of expandable jaws 38 to allow expandable jaws 38 to open by their own spring tension. When this happens, compression spring 27 acting against shoulder 24 of cylinder 23 forces raised portion 25 of cylinder 23 into reduced diameter area 40 of expandable jaws 38 holding them open. At the same time, compression spring 15 forces acting against valve stop 17 forces inner valve assembly 16 into a seating contact with valve seat surface 14 of fitting 12 closing off the line section to the left of the drawing.

When fitting 52 is removed from cylinder 23, tapered nut 61 is no longer limited in its travel by recess 43 of recess spider fitting 42. When this happens, compression spring 62 acting against inner valve fitting 66 forces it into a sealing contact with valve seat surface 58 of fitting 52. When this happens, the line to the right of the drawing is closed.

Referring to FIG. 2, when cylinder 23 is forced into a slidably received fitting 52, tapered nut 61 will come in contact with recess 43 of recess spider fitting 42 forcing inner valve asembly 59 to the right compressing compression spring 63 and opening the line to the right of the drawing. At the same time, cylinder 23 will be forced to the left, compressing compression spring 27 and moving increased diameter portion 25 to the left, allowing reduced diameter portion 40 of expandable jaws 38 to close, allowing compression spring 33 to move outer sleeve 32 to the right, maintaining the expandable jaws 38 in a contracted position. Spider fitting 22 then forces tapered nut 19 and inner valve assembly 16 to the left, compressing compression spring 15 until valve 17 reaches the limit of its travel. This will open the line to the left of the drawing.

Protective sleeve 71 will also move to the left and over the outside edge of expandable jaws 38 further retaining them in a closed position. Compression spring 74 maintains this position of protective sleeve 71.

Should it be desired to open the fluid line coupler manually, protective sleeve 71 is moved to the right compressing compression spring 74 until it no longer restricts the end of expandable jaws 38. At the same time, enough tension is placed on the lines sufficiently to force outer sleeve 32 to the left by overcoming the tension of compression spring 33 and allowing expandable jaws 38 to open.

Should an excessive tension be placed on the two coupled lines tending to pull them apart, the dished resilient spring steel washers 57 will compress between slidable washer flange 23 and threadably attached washer flange 56 allowing fitting 52 to move lightly to the right carrying with it outer protective sleeve 77 until it no longer restrains the end of expandable jaws 58. When this happens, expandable jaws 58 will be forced open by bevelled surface 60 of slidable washer flange 54, and the entire assembly will automatically uncouple while at the same time inner valve assemblies 16 and 59 will seat in the manner described above.

The required tension for parting the two sections will depend upon the tension of springs 57 and 34 together with the coefficient of friction between surfaces 36 and 37.

It should be understood, of course, that the foregoing disclosure relates to only a preferred embodiment of the invention and that it is intended to cover all changes and modifications of the examples of the invention herein chosen for the purposes of the disclosure which do not constitute departures from the spirit and scope of the invention.

What is claimed is:

1. A fluid line coupler for coupling first and second fluid lines comprising:
   a first cylinder having a retaining shoulder;
   a second cylinder slidably disposed within said first cylinder, said second cylinder having a retaining shoulder;
   said first and second cylinders each having one end opposite said expandable jaws in communication with a first fluid line;
   a coiled spring carried by said first and second cylinders, said coiled spring being compressed between said first cylinder retaining shoulder and said second cylinder retaining shoulder;
   a plurality of expandable jaws having a first recess at one end thereof for cooperation with said first cylinder shoulder and being retained thereby;
   an outer sleeve slidably carried by said plurality of expandable jaws;
   spring-biasing means for biasing said outer sleeve towards an opening end of said expandable jaws;
   valve means slidably receiving said second cylinder, said valve means operable to close said second fluid line when said second cylinder is not slidably received therein and to open said second fluid line when said second cylinder is slidably received therein; and
   said valve means including a third cylinder for receiving said second cylinder, said third cylinder having a fixed annular retaining shoulder on the outside thereof and toward the entrance thereof and a slidable retaining shoulder on the outside thereof, said fixed retaining shoulder and said slidable retaining shoulder retaining a spring means and cooperating with a recess on the inner periphery of said expandable jaws when said second cylinder is inserted within said first cylinder within said third cylinder.

2. The fluid line coupler of claim 1 and further including a second spring-biased sleeve, slidably coupled to said third cylinder, said second spring-biased sleeve having a shoulder constricting said expandable jaws when said second cylinder and said third cylinder are in coupled relationship.

References Cited

UNITED STATES PATENTS 2,727,759   12/1955   Elliott   137—614.04
3,028,179   4/1962   Abramoska   137—614.04

ALAN COHAN, *Primary Examiner.*

H. M. COHN, *Assistant Examiner.*

U.S. Cl. X.R.

285—1, 86, 316